Aug. 5, 1958     T. P. CLARK     2,845,779
FINGERLING TRANSFER DEVICES
Filed June 12, 1956
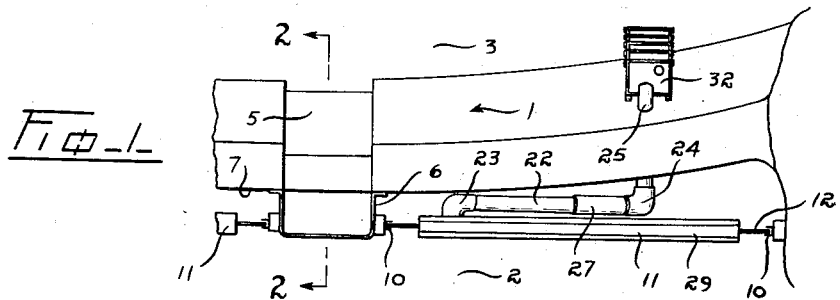
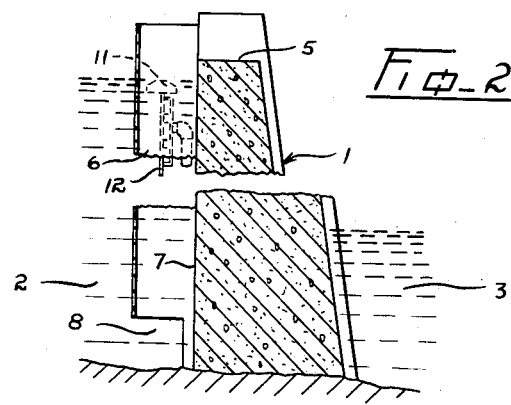
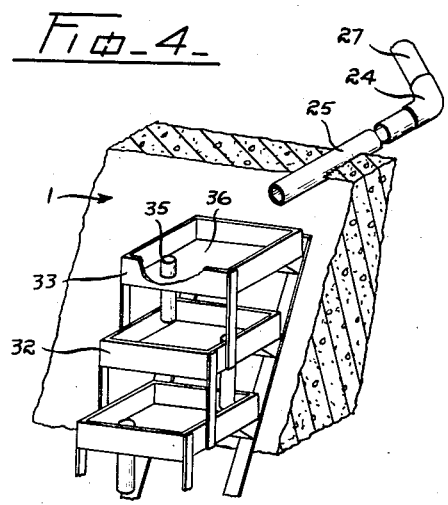
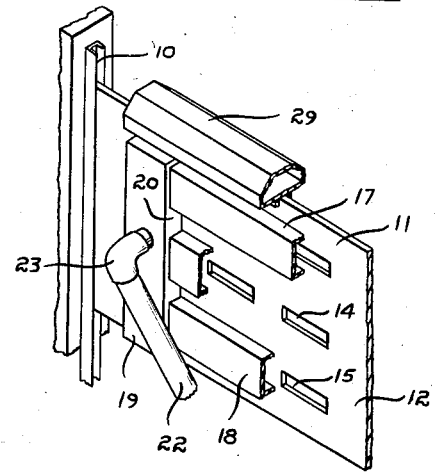
INVENTOR
TREVOR P. CLARK
ATTORNEY

United States Patent Office 2,845,779
Patented Aug. 5, 1958

2,845,779
FINGERLING TRANSFER DEVICES
Trevor P. Clark, North Vancouver, British Columbia, Canada
Application June 12, 1956, Serial No. 590,849
1 Claim. (Cl. 61—21)

My invention relates to improvements in fingerling transfer devices for use in allowing small fish to pass downstream from above a dam to a lower pound or body of water on the downstream side of said dam.

It is well known that salmon and other fish hatched in fresh water streams will regularly swim at less than fifteen feet below the river level and it is proposed to take advantage of this phenomenon in providing means for letting the salmon fingerlings get from the hatcheries past power or other dams down to the sea where the fish develop as to size.

Amongst the objects of the invention is the provision of a floatable or otherwise vertically movable device which is adapted to intercept the fish on their way downstream towards the dam.

Other objects are to provide means whereby the fish are encouraged to enter the device above the dam so as to travel progressively with the current until past the dam, and to provide a convenient ladder structure for the fish to reach the bottom pound water level without suffering any damage through dropping from high elevations or otherwise.

Other objects will appear as the specification proceeds.

Referring to the accompanying drawings:

Figure 1 is a part plan view of a dam showing the invention.

Figure 2 is an enlarged fractionated sectional view taken on the line 2—2 of Figure 1.

Figure 3 is a perspective view showing a portion of the fish trap.

Figure 4 is a perspective view showing the ladders used on the downstream side of the dam.

In the drawings like characters of reference indicate corresponding parts in each figure.

The numeral 1 indicates generally a dam built across a river or other body of water and providing an upper and lower pound indicated by the numerals 2 and 3 respectively. In order to prevent fish from going over the spillway 5, a water chamber 6 is erected on the upper face 7 of the dam, which chamber is provided with an outlet opening 8 at its base which would preferably be below the normal swimming zone of the fish, or say fifteen feet or more, and at high water mark the water entering the opening 8 would flow outwardly over the spillway. If any other opening is formed for letting water flow through the dam, it would be assumed to be placed in deep water in order to avoid enticing the fish to dive into the running stream which would be created by such an opening allowing water to be drawn off from the upper pound 2.

One or more pairs of vertical guides 10 would be set up in front of the upper face of the dam and a fish trap 11, see Figures 1, 2 and 3, would be mounted for vertical sliding movement in each pair of guides. Each fish trap 11 would have a vertical height of somewhat more than fifteen feet but not more than thirty feet and would consist of a panel 12 having a plurality of horizontal rows 14 of openings 15. The openings are large enough to allow a fingerling to swim freely therethrough and would preferably be spaced apart end to end to generally deter a fish having entered an opening from coming out again. The openings 15 would normally be disposed to face upstream. The rear of the panel 12 is provided with a boxing 17 preferably consisting of vertically spaced horizontal channel members 18, all of which communicate at one end with a collecting chamber 19 which is a boxlike chamber having at least one side wall 20 through which the channel members 18 communicate with the chamber 19. A light water pipe 22 having elbows 23 and 24 connects the chamber 19 with an outlet pipe 25 which passes through the dam as shown in Figure 4. The pipe 22 is provided with a telescopic section 27 and the elbows 23 and 24 are adapted to swing in order to permit the fish trap to move vertically and maintain a constant level relative to the level of the water in the upper pound.

As shown herein, the fish trap 11 is preferably made of wood and is fitted along its upper edge with a float 29 and since the panel 12 forming the fish trap extends horizontally across the dam the only way that fingerlings or fish generally can reach the face of the dam will be by diving below the lower fish trap level.

The fish ladder generally indicated by the numeral 32 is shown as being supported upon the downstream face of the dam, though it is preferred to mount it on the sides of the stream some distance below the dam. The fish ladder as shown consists of a plurality of chambers 33 arranged in echelon with one chamber overhanging the one below it and each upper chamber having a spout 35 projecting upwardly a suitable distance above the chamber floor 36, so as to maintain a substantial body of water in each chamber and extending downwardly to or below the level of the water in the chamber therebelow.

In operation, fish wishing to travel downstream will reach the panel 12 of the fish ladder and water movement will be manifested around each opening 15 which will attract the fish and cause them to enter. Water movement will also be constantly manifested at the entrance to the pipe 22 so that the fish will pass therethrough, through the dam and into the fish ladder where they can descend leisurely or otherwise to the level of the lower pound. Since the panel 12 reaches at all times down to the zone where the fish will not swim, there will be very little likelihood of any fish going over any part of the dam even during high water mark and since said fish trap automatically maintains a definite level relative to that of the upper pound, the loss or damage to fingerlings will be negligible.

What I claim as my invention is:

A device for passing fingerlings downstream past a dam, said device comprising a fish trap having a panel positioned in the water and having a plurality of horizontal openings in vertically spaced relation, a float connected to the upper part of said panel rendering it buoyant, a chamber supported upon a face of the panel, said chamber being divided into shallow channel members connected vertically by a box-like member, said openings communicating with said chamber, the lowermost of said openings being at least fifteen feet from the surface of the water and a pipe leading from the interior of the chamber to discharge below the dam, said pipe being wholly unobstructed and of sufficient size to pass a continuous stream of water therethrough and also the fingerlings entering the openings, the upper end of the pipe being flexibly connected to said chamber and adapted to rise and fall with the chamber when afloat, said water pipe being connected to the upper part of the box-like channel member.

References Cited in the file of this patent
UNITED STATES PATENTS
2,667,036    Davis et al. _____ Jan. 26, 1954
FOREIGN PATENTS
59,987    Austria _____ 1913